United States Patent
Takara et al.

(10) Patent No.: US 12,123,462 B2
(45) Date of Patent: Oct. 22, 2024

(54) JOURNAL BEARING AND ROTARY APPLIANCE USING A JOURNAL BEARING

(71) Applicant: Mitsubishi Generator Co., Ltd., Hyogo (JP)

(72) Inventors: Naokatsu Takara, Tokyo (JP); Yosuke Uchida, Tokyo (JP); Saya Okano, Tokyo (JP)

(73) Assignee: Mitsubishi Generator Co., Ltd., Hyogo (JP)

( * ) Notice: Subject to any disclaimer, the term of this patent is extended or adjusted under 35 U.S.C. 154(b) by 77 days.

(21) Appl. No.: 17/911,432

(22) PCT Filed: Apr. 7, 2020

(86) PCT No.: PCT/JP2020/015600
§ 371 (c)(1),
(2) Date: Sep. 14, 2022

(87) PCT Pub. No.: WO2021/205523
PCT Pub. Date: Oct. 14, 2021

(65) Prior Publication Data
US 2023/0115499 A1 Apr. 13, 2023

(51) Int. Cl.
*F16C 33/10* (2006.01)
*F16C 17/03* (2006.01)

(52) U.S. Cl.
CPC ........ *F16C 33/106* (2013.01); *F16C 33/1045* (2013.01); *F16C 33/108* (2013.01); *F16C 17/03* (2013.01)

(58) Field of Classification Search
CPC .... F16C 17/03; F16C 33/1045; F16C 33/106; F16C 33/108
See application file for complete search history.

(56) References Cited

U.S. PATENT DOCUMENTS

| 7,237,957 B2 * | 7/2007 | Geiger | F16C 17/03 384/312 |
| 10,907,681 B2 * | 2/2021 | Konishi | F16C 33/1045 |

(Continued)

FOREIGN PATENT DOCUMENTS

| DE | 102017120578 A1 * | 3/2019 |
| JP | 58180815 A * | 10/1983 |

(Continued)

OTHER PUBLICATIONS

International Search Report and Written Opinion mailed on Jul. 14, 2020, received for PCT Application PCT/JP2020/015600, filed on Apr. 7, 2020, 19 pages including English Translation.

*Primary Examiner* — James Pilkington
(74) *Attorney, Agent, or Firm* — XSENSUS LLP (57) ABSTRACT

A journal bearing includes an oil supply nozzle, having an oil distribution part which extends in an axial direction of the rotation shaft and supplies lubricating oil, and a pad, provided at the rear side of the oil supply nozzle, in a rotational direction of the rotation shaft and supporting the rotation shaft rotatably. The inner periphery face of the pad, which opposes the outer periphery face of the rotation shaft, has an opening side face, in which the radial direction spacing between the inner periphery face and the outer periphery face of the rotation shaft becomes smaller, from the front end face of the pad, located at the front side in the rotational direction of the rotation shaft, toward the rear side in the rotational direction, and between the oil distribution part and the pad, the journal bearing has a bubble discharge path which discharges air bubbles.

15 Claims, 10 Drawing Sheets

(56) References Cited

U.S. PATENT DOCUMENTS

| | | | |
|---|---|---|---|
| 2014/0205224 A1 | 7/2014 | Hemmi et al. | |
| 2019/0277338 A1 | 9/2019 | Konishi et al. | |

FOREIGN PATENT DOCUMENTS

| | | | |
|---|---|---|---|
| JP | 2000-274432 A | 10/2000 | |
| JP | 2012-172729 A | 9/2012 | |
| JP | 2019-138424 A | 8/2019 | |
| JP | 2019-157956 A | 9/2019 | |
| WO | 2013/046404 A1 | 4/2013 | |

* cited by examiner

JOURNAL BEARING AND ROTARY APPLIANCE USING A JOURNAL BEARING

CROSS-REFERENCE TO RELATED APPLICATION

The present application is based on PCT filing PCT/JP2020/015600, filed Apr. 7, 2020, the entire contents of which is incorporated herein by reference.

FIELD OF THE INVENTION

The present application relates to the field of a journal bearing and a rotary appliance using a journal bearing.

BACKGROUND OF THE INVENTION

In the Patent Document 1, a pad type journal bearing which employs a direct lubricating method is described. This journal bearing is equipped with a plurality of pads which is prepared swingably on the inside of a bearing inner ring, and supports a journal automatic-center-adjustably; and an oil supply nozzle which is prepared at the rotation upper stream of each of the pads, with respect to the rotational direction of a rotation shaft, and supplies lubricating oil to a spacing between the inner periphery face of the pad and the outer periphery face of the rotation shaft. At least in the central part of a front side edge of the pad, a chamfering part, which is inclined toward an inner circumference face of the pad, is formed. In the Patent Document 1, it is described that, since a chamfering part is provided, oil flows into the spacing efficiently, and then, with a small amount of oil supply, the spacing can be fully filled with oil.

CITATION LIST

Patent Literature

Patent Document 1 JP 2000-274432

SUMMARY OF THE INVENTION

Technical Problem

However, in the journal bearing according to the Patent Document 1, near the outer periphery face of the rotation shaft, a strong shearing flow is caused in the rotational direction of the rotation shaft, and air bubbles of the air which are contained in the oil flow into the spacing. Thereby, the spacing is not always fully filled with oil unfortunately.

Moreover, near the chamfering part of the pad, which is slightly away from the outer periphery face of the rotation shaft, oil and air bubbles having shearing flow in the rotational direction of the rotation shaft are rebounded at the chamfering part of the pad, and a swirl flow which flows toward a direction opposite to the rotational direction of the rotation shaft is caused. The density of air bubbles which are contained in the oil is lower than that of the oil. As for the centrifugal force by the swirl flow, the air bubbles are smaller than the oil, and then, the air bubbles tend to stay at the center of a swirl flow. The air bubbles gather near the chamfering part of the pad in which a swirl flow is caused, and larger air bubbles are produced. Therefore, there is a case in which the air bubbles finally invade through the spacing. Those air bubbles are more easily compressed than the oil. Thereby, when the air bubbles invade through the spacing, the pressure of an oil film supporting the rotation shaft is reduced, and there remains a problem that an unstable oscillation may be caused on the rotation shaft and the pad.

The present application is made in order to solve the subjects mentioned above, and aims at offering a journal bearing and a rotary appliance which can remove air bubbles which are contained in the oil, and fully fill a spacing with the oil efficiently, with a small amount of oil supply.

Solution to Problem

A journal bearing according to the present application is a journal bearing which supports a rotation shaft of a rotary appliance, and the journal bearing, includes;
   an oil supply nozzle which has an oil distribution part, extending in an axial direction of the rotation shaft and supplying lubricating oil, and
   a pad which is provided at a rear side of the oil supply nozzle, in a rotational direction of the rotation shaft, and supports the rotation shaft rotatably,
   wherein an inner periphery face of the pad, which opposes an outer periphery face of the rotation shaft, has an opening side face, in which a radial direction spacing between the inner periphery face and the outer periphery face of the rotation shaft becomes smaller, from a front end face of the pad, located at a front side in the rotational direction of the rotation shaft, toward the rear side in the rotational direction, and
   between the oil distribution part and the pad, the journal bearing has a bubble discharge path which discharges air bubbles mixed in the lubricating oil.

Advantageous Effects of Invention

According to the present application, on the inner periphery face of the pad, which is located at the rear side of the oil supply nozzle, the journal bearing has an opening face, in which the spacing in the radial direction between the inner periphery face and the outer periphery face of the rotation shaft becomes smaller, from the front end face of the pad, located at the front side in the rotational direction of the rotation shaft, toward the rear side in the rotational direction. Therefore, it becomes possible to supply the oil efficiently in the spacing between the inner periphery face of the pad and the outer periphery face of the rotation shaft. Furthermore, since the journal bearing has, between the oil distribution part and the pad, a bubble discharge path which discharges air bubbles mixed in the lubricating oil, the air bubbles do not invade into the region of oil film between the inner periphery face of the pad and the outer periphery face of the rotation shaft. Then, it becomes possible to prevent an unstable oscillation from occurring on the rotation shaft and the pad.

As mentioned above, according to the present application, it becomes possible to obtain a journal bearing and a rotation electric machine using a journal bearing, which can remove the air bubbles contained in the oil, and further can fully fill a spacing with the oil efficiently, with a small amount of oil supply.

DESCRIPTION OF EMBODIMENTS

Embodiment 1

Figure 1:
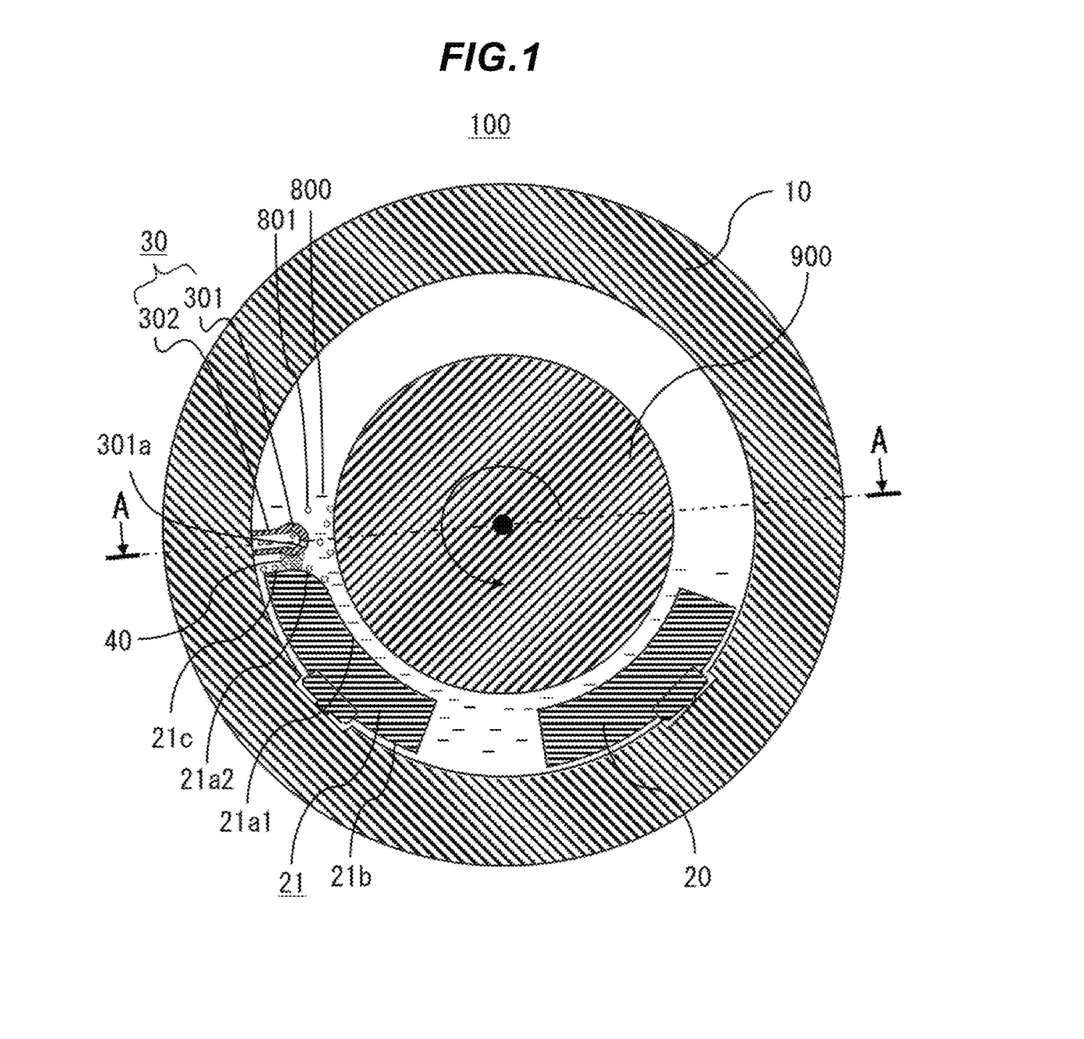
FIG. 1 is a sectional view perpendicular to the axial direction, which shows the constitution of a journal bearing according to the Embodiment 1.
Figure 2:
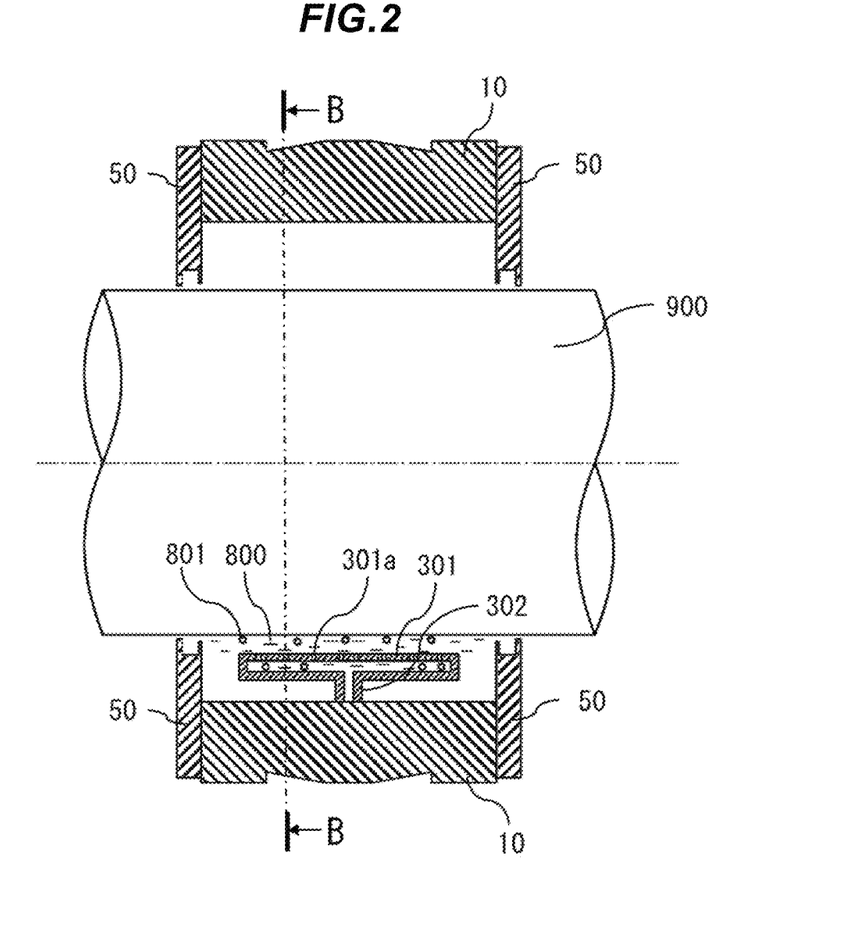
FIG. 2 is a sectional view taken along the line A-A of FIG. 1, which shows the constitution of the journal bearing according to the Embodiment 1.

The journal bearing according to the Embodiment 1 is a slide bearing, which supports a rotation shaft rotatably. The journal bearing according to the present Embodiment can be applied to various rotary appliances, such as a rotation electric machine. FIG. 1 is a sectional view which shows the constitution of the journal bearing 100 according to the present Embodiment. In FIG. 1, a section is shown, where the journal bearing 100 and the rotation shaft 900 are cut at the plane perpendicular to the axial center of the rotation shaft 900. FIG. 2 is a sectional view which shows the section taken along the line A-A of FIG. 1. The up and down direction in FIG. 1 denotes, for example, a vertical up and down direction. In FIG. 1, and in FIG. 3 and subsequent drawings which will be explained, the rotational direction of the rotation shaft 900 is shown by an arrow. Moreover, the front side of the rotation shaft 900 in the rotational direction is referred to as an upstream side, and the rear side in the rotational direction is referred to as a downstream side.

As shown in FIG. 1 and FIG. 2, the journal bearing 100 has an annular shape, as a whole. In the journal bearing 100, a rotation shaft 900 is inserted. The journal bearing 100 is configured to support the rotation shaft 900 rotatably. In FIG. 1, the rotational direction of the rotation shaft 900 is a direction of counterclockwise rotation. The axial center of the rotation shaft 900 extends in a horizontal direction. In the following explanation, a direction parallel to the axial center of the rotation shaft 900 is referred to as an axial direction. Moreover, the radial direction which is centered on the axial center is referred to simply as a radial direction. The circumferential direction which is centered on the axial center is referred to simply as a circumferential direction.

The journal bearing 100 is equipped with a carrier ring 10 which is arranged at an outer periphery side of the rotation shaft 900; a downstream pad 20 which is arranged at a downstream side, in the rotational direction of the rotation shaft 900; and an upstream pad 21 which is arranged at an upstream side, in the rotational direction of the rotation shaft 900, where those pads are arranged at an outer periphery side of the rotation shaft 900, and also at the inner periphery side of the carrier ring 10. The downstream pad 20 and the upstream pad 21 are provided between a downward semicircle portion, amid the outer periphery face of the rotation shaft 900, and a downward semicircle portion, amid the inner periphery face of the carrier ring 10. Along the outer periphery face of the rotation shaft 900, the downstream pad 20 and the upstream pad 21 are each arranged at a different position of the circumferential direction. In the rotational direction of the rotation shaft 900, the upstream pad 21 is arranged at the upstream side of the downstream pad 20, with a spacing in between.

In the present Embodiment, the downstream pad 20 and the upstream pad 21 are configured so that each of the pads can incline with respect to the outer periphery face of the rotation shaft 900. The journal bearing 100 which has, in this way, a downstream pad 20 and an upstream pad 21 is called a tilting pad journal bearing.

The journal bearing 100 has an oil supply nozzle 30 which supplies lubricating oil 800, between the rotation shaft 900 and each of the downstream pad 20 and the upstream pad 21. The oil supply nozzle 30 is arranged at the upstream side of the upstream pad 21. The oil supply nozzle 30 is equipped with an oil distribution part 301 which includes oil supply holes 301a arranged in the axial direction, where the oil supply holes distribute oil in the axial direction and supply it; and an oil supply inlet 302 which supplies oil to the oil distribution part 301. When the rotation shaft 900 rotates, the lubricating oil 800, supplied from the oil supply hole 301a, will flow in the same direction as the rotational direction of the rotation shaft 900, in connection with shear forces by the rotation of the rotation shaft 900. That is, in the journal bearing 100, the flow direction of the lubricating oil 800 is the same with the rotational direction of the rotation shaft 900. Moreover, a side plate 50 is arranged at both sides of the axial direction of the journal bearing 100a, and the lubricating oil 800 is supplied to the inside, surrounded by the carrier ring 10, the side plates 50, and the rotation shaft 900.

Next, explanation will be made about the constitution of the upstream pad 21. As a whole, the upstream pad 21 has a partial cylinder-like shape. The upstream pad 21 has an inner periphery face 21a, an outer periphery face 21b, and a front end face 21c. The inner periphery face 21a is arranged to be opposite to the outer periphery face of the rotation shaft

900. The outer periphery face 21*b* is arranged to be opposite to the inner periphery face of the carrier ring 10. The front end face 21*c* at an upstream side is formed in the upstream side with respect to the inner periphery face 21*a*, and is an end face which connects the inner periphery face 21*a* and the outer periphery face 21*b*. Moreover, the inner periphery face 21*a* has a partial cylinder face 21*a*1, and an opening side face 21*a*2, which is arranged at the upstream side of the partial cylinder face 21*a*1, and is located at the outer diameter side of the partial cylinder face 21*a*1.

Figure 3:
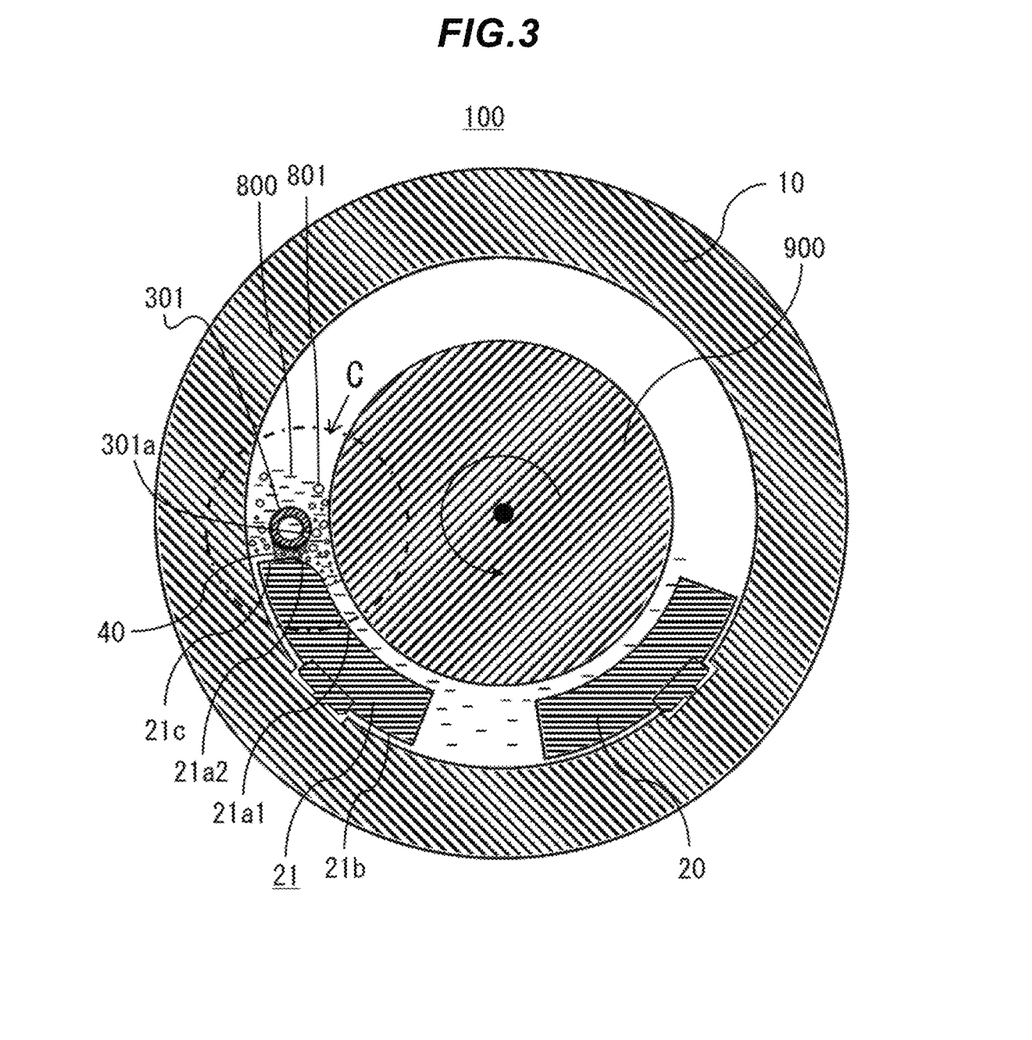
FIG. 3 is a sectional view taken along the line B-B of FIG. 2, which shows the constitution of the journal bearing according to the Embodiment 1.
Figure 4:
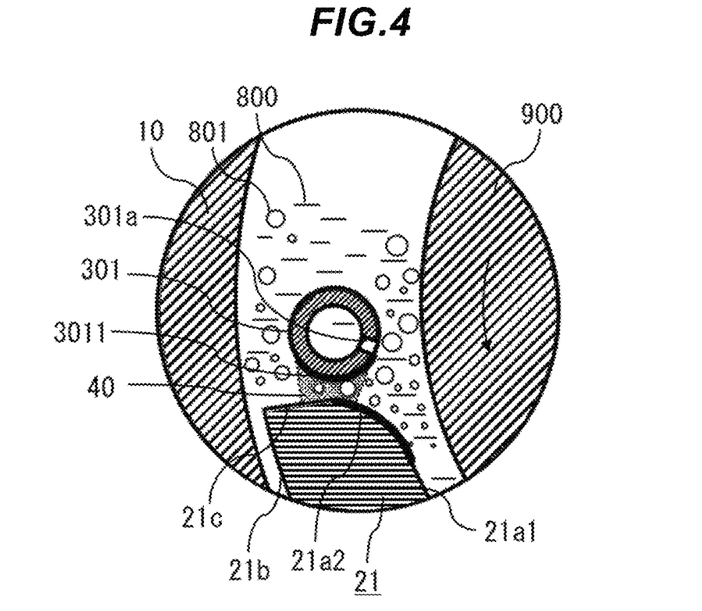
FIG. 4 is a detailed sectional view of the C portion in FIG. 3, which shows the surrounding constitution of an oil supply nozzle of the journal bearing according to the Embodiment 1.

Furthermore, the journal bearing 100 is equipped with a bubble discharge path 40, which is enclosed with an outer wall face 3011 and a front end face 21*c* or an opening side face 21*a*2 of the upstream pad 21, where the outer wall face 3011 is located at the downstream side of the oil supply hole 301*a*, among the outer wall faces of the oil distribution part 301. FIG. 3 is a sectional view which shows the section taken along the line B-B of FIG. 2. FIG. 4 is a drawing which shows the details of the C portion of FIG. 3. Here, the bubble discharge path 40 is surrounded with the furthest face and the nearest face from the outer periphery face of the rotation shaft 900, which cross with the outer wall face 3011, among faces perpendicular to the front end face 21*c* or the opening side face 21*a*2.

Figure 5:
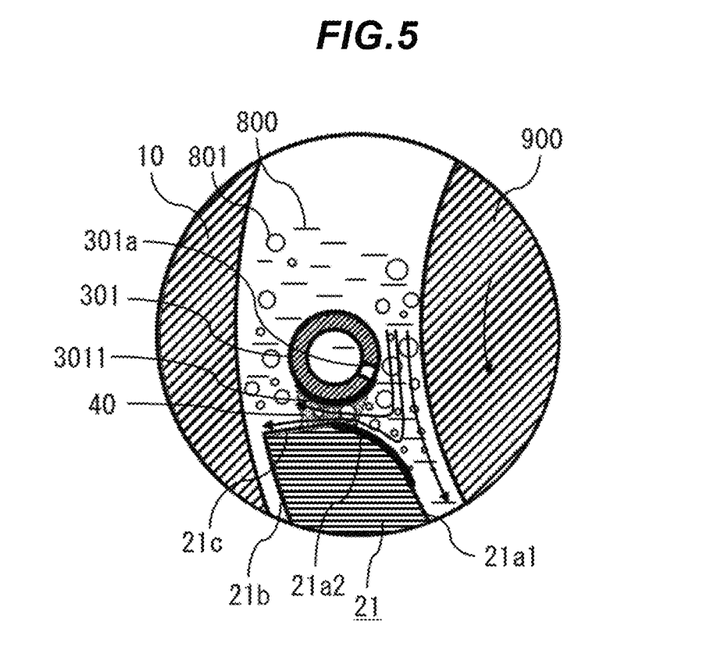
FIG. 5 is a detailed sectional view of the C portion in FIG. 3, which shows the surrounding constitution of an oil supply nozzle of the journal bearing according to the Embodiment 1.
Figure 6:
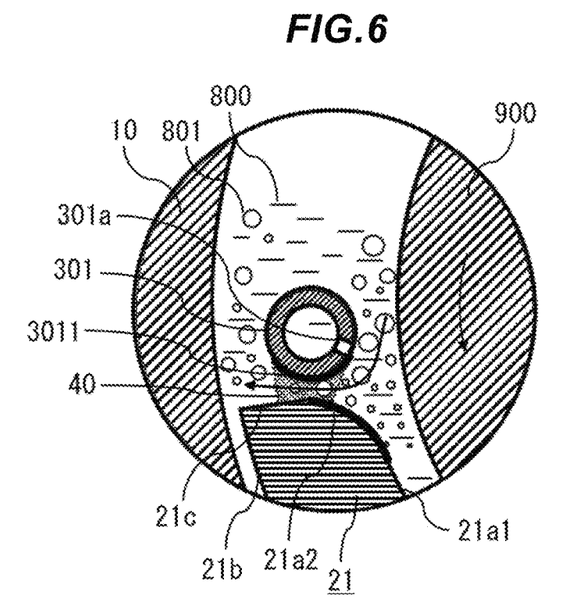
FIG. 6 is a detailed sectional view of the C portion in FIG. 3, which shows the surrounding constitution of an oil supply nozzle of the journal bearing according to the Embodiment 1.

The flow of oil and air in the present Embodiment will be explained, using FIG. 5, FIG. 6, and FIG. 7. Like FIG. 4, these drawings are the ones which show the details of the C portion of FIG. 3. Inside of the journal bearing 100, the vertically above is an air layer and the vertical lower part is an oil layer. At a border plane of the air layer and the oil layer, due to the shear forces by the rotation of the rotation shaft 900, air is involved in the oil layer, and air bubbles 801 are formed. In FIG. 5, a thick arrow is used to show the flow of the lubricating oil 800 and the air bubble 801. The lubricating oil 800, which is supplied from the oil supply hole 301*a*, unites with the surrounding air bubbles 801 and flows into the downstream side. However, at least a part of the lubricating oil 800 passes through the spacing between the opening side face 21*a*2 and the outer periphery face of the rotation shaft 900, and then, passes through the spacing between the partial cylinder face 21*a*1 and the outer periphery face of the rotation shaft 900.

The oil (defined as an oil film), which is in the spacing (defined as the region of oil film) between the partial cylinder face 21*a*1 and the outer periphery face of the rotation shaft 900, is subject to the shear forces by the rotation of the rotation shaft 900, and a perpendicular force (defined as the pressure of oil film) with respect to the partial cylinder face 21*a*1 and the outer periphery face of the rotation shaft 900 is generated. When the number of rotations of the rotation shaft 900 is large, this pressure of oil film may support the rotation shaft 900, and thereby, the rotation shaft 900 and the downstream pad 20 and the upstream pad 21 do not make a contact. This pressure of oil film is generated only when the oil film is in a wedge shape in which the size of the oil film in the radial direction becomes smaller towards the downstream side. The effect of generating a pressure of oil film due to this wedge shape is referred to as a wedge effect. In the general bearing, in order to acquire an efficient wedge effect, it is recommended that the curvature radius of the partial cylinder face 21*a*1 is made larger than the curvature radius of the rotation shaft 900, by about from 0 to 1%. Even in a large sized bearing, the size of an oil film in the radial direction is as narrow as some hundreds of micrometers or less. Thereby, amid the lubricating oil 800 which is supplied from the oil supply hole 301*a*, only very slight amount of oil which is near the outer periphery face of the rotation shaft 900 flows into the region of oil film. Most of the remaining oil flows backward to the upstream side along the opening side face 21*a*2, and is discharged through the bubble discharge path 40 at the outer diameter side. As the region of oil film is more distant from the outer periphery face of the rotation shaft 900, the influence of shear flow caused by the rotation of the rotation shaft 900 becomes smaller, and then, the speed of the oil which flows backward becomes large.

Next, explanation will be made, in contrast with a comparative example, about the action of the opening side face 21*a*2 and the bubble discharge path 40, in the present Embodiment. In FIG. 6, the flow of big air bubbles 801 is shown by a thick arrow. The force committed to the air bubble 801 includes a turbulent flow lift force which acts in the direction away from the wall surface, due to a turbulent flow, and a drag which acts in a direction opposite to a relative velocity between the air bubble 801 and the oil. While the turbulent flow lift force is proportional to the volume of the air bubble 801, the drag is proportional to the surface area of the air bubble 801. Because big air bubbles 801 are relatively large in the volume, compared with the surface area, a turbulent flow lift force becomes large with respect to a drag. Then, the big air bubbles are easy to separate from the outer periphery face of the rotation shaft 900. Moreover, the farther from the outer periphery face of the rotation shaft 900, the higher the speed of the oil which flows backward to the upstream side along the opening side face 21*a*2. After the separation from the outer periphery face of the rotation shaft 900 due to a turbulent flow lift force, the big air bubbles 801 near the outer periphery face of the rotation shaft 900 ride on the flow of the oil which flows backward and are discharged efficiently to the bubble discharge path 40.

Figure 7:
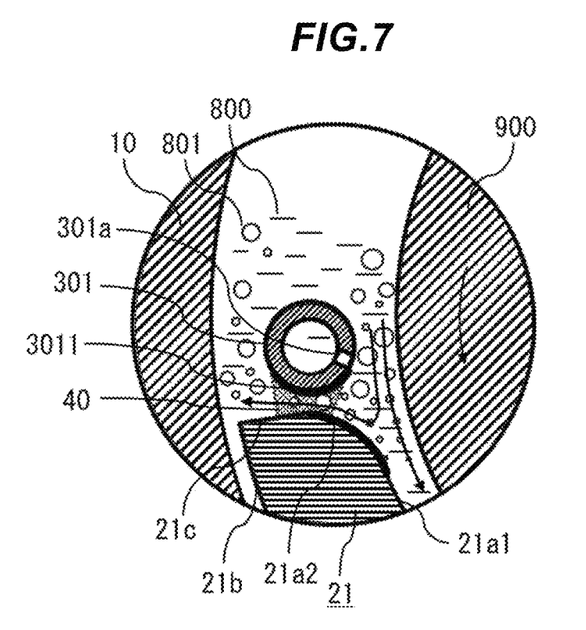
FIG. 7 is a detailed sectional view of the C portion in FIG. 3, which shows the surrounding constitution of an oil supply nozzle of the journal bearing according to the Embodiment 1.

In FIG. 7, the flow of small air bubbles 801 is shown by a thick arrow. The small air bubbles 801 which are separated from the outer periphery face of the rotation shaft 900 ride on the flow of the oil which flows backward, and are discharged efficiently to the bubble discharge path 40. The opening side face 21*a*2 is formed so that the minimum value of the radial direction distance from the outer periphery face of the rotation shaft 900 may become smaller toward the downstream side. Then, also here, a pressure is generated in the oil due to the wedge effect. The small air bubbles 801 near the outer periphery face of the rotation shaft 900 tend to flow to the region of oil film. However, the minimum value of the radial direction distance between the opening side face 21*a*2 and the outer periphery face of the rotation shaft 900 becomes smaller toward the downstream side. Then, the pressure which is generated in the oil due to the wedge effect rises. Therefore, by Henry's law in which as pressure is higher, gaseous solubility becomes higher, the small air bubbles 801 dissolve in the oil, before invading into the region of oil film.

As mentioned above, the journal bearing 100 of the present Embodiment, which is shown in FIGS. 1-7, is equipped with the oil distribution part 301 and the bubble discharge path 40. In the oil distribution part 301, the lubricating oil 800 and the air bubbles 801, which both have a shear flow in the rotational direction of the rotation shaft 900, can also be prepared in the center position of a swirl flow, which occurs by rebounding at the front end face 21*c* and the opening side face 21*a*2. Then, it becomes possible to restrain the swirl flow which will be a factor to stay the air bubbles 801 near the opening side face 21*a*2. Moreover, the big air bubbles 801 are discharged, through the bubble discharge path 40, at the outer diameter side, and the air bubbles can be released, through the spacing between the carrier ring 10 and the oil distribution part 301, by buoyant force, to the atmospheric layer in the vertically above. The small air bubbles 801, left behind near the rotation shaft 900, dissolve in the oil by a pressure which is generated by the wedge effect, and thereby, the invasion of the air bubbles 801 to the region of oil film can be restrained.

As explained above, the journal bearing 100 according to the present Embodiment includes: an oil supply nozzle 30, having an oil distribution part 301, which extends in an axial direction of the rotation shaft 900, and supplies lubricating oil 800, and an upstream pad 21, provided at the rear side of the oil supply nozzle 30, in a rotational direction of the rotation shaft 900 and supporting the rotation shaft 900 rotatably, wherein an inner periphery face 21*a* of the upstream pad 21, which opposes an outer periphery face of the rotation shaft 900, has an opening side face 21*a*2 in which the radial direction spacing between the inner periphery face 21*a* and the outer periphery face of the rotation shaft 900 becomes smaller, from the front end face 21*c* of the upstream pad 21, located at the front side in the rotational direction of the rotation shaft 900, toward the rear side in the rotational direction, and between the oil distribution part 301 and the upstream pad 21, the journal bearing has a bubble discharge path 40 which discharges air bubbles 801 mixed in the lubricating oil 800.

According to this configuration, the invasion of air bubbles 801 to the region of oil film is restrained. Thereby, the region of oil film can be fully filled with oil, with a small amount of oil supply, and an unstable oscillation can be prevented.

Moreover, there is case where the air bubbles 801 may be contained also in the oil which is supplied from the oil supply nozzle 30. However, according to the constitution of the present Embodiment, in order to supply the oil injected from the oil supply hole 301*a* to the region of oil film, the oil, like the surrounding oil, needs to pass surely along the spacing between the opening side face 21*a*2 and the outer periphery face of the rotation shaft 900. Thereby, the air bubbles 801 in the oil, which is injected from the oil supply hole 301*a*, are discharged to the bubble discharge path 40, like the air bubbles 801 in the surrounding oil. Therefore, also regarding the air bubbles 801 in the oil which is injected from the oil supply hole 301*a*, the invasion to the region of oil film can be restrained, the region of oil film can be fully filled with oil, with a small amount of oil supply, and an unstable oscillation can be prevented.

Friction loss, which is caused by the friction with the rotation shaft and the oil, is divided into an oil film loss which is the friction loss by shear of the region of oil film; and an agitation loss which is the friction loss by the agitation of oil collected on domains other than the region of oil film. When a bearing loss is defined as a loss which is caused in a journal bearing to the energy of the rotation shaft, the bearing loss is almost equal to the sum of an oil film loss and an agitation loss. In general, the oil film loss is proportional to the area of the inner periphery face of a pad, and the agitation loss is proportional to the amount of oil supply.

According to the present Embodiment, with a small amount of oil supply, the region of oil film can be fully filled with oil. Thereby, the oil which is collected on domains other than the region of oil film can be reduced. Therefore, according to the present Embodiment, the agitation loss can be reduced and, thereby, the bearing loss of the journal bearing 100 can be reduced.

Moreover, like the constitution shown in FIG. 1 and FIG. 3 to FIG. 7, the opening side face 21*a*2 is made into a curved surface shape, in which the angle between the first tangent line of the opening side face 21*a*2 and the second tangent line of the outer periphery face of the rotation shaft 900 becomes smaller toward the downstream side, where the second tangent line is at the position which opposes in the radial direction with respect to the point of contact of this first tangent line. By doing so, the velocity vector of the radial direction of the air bubbles 801 which flow backward along the opening side face 21*a*2 becomes large. Thereby, it becomes possible to discharge efficiently to the outer diameter side through the bubble discharge path 40, without the interruption by the oil distribution part 301. Moreover, by reducing, in a quadratic function, the spacing between the opening side face 21*a*2 and the rotation shaft 900, toward the downstream side, the pressure of the oil in the spacing can be raised more efficiently. Thereby, the small air bubbles 801 can be dissolved more efficiently and the invasion of the small air bubbles 801 to the region of oil film can be restrained.

Embodiment 2

Figure 8:
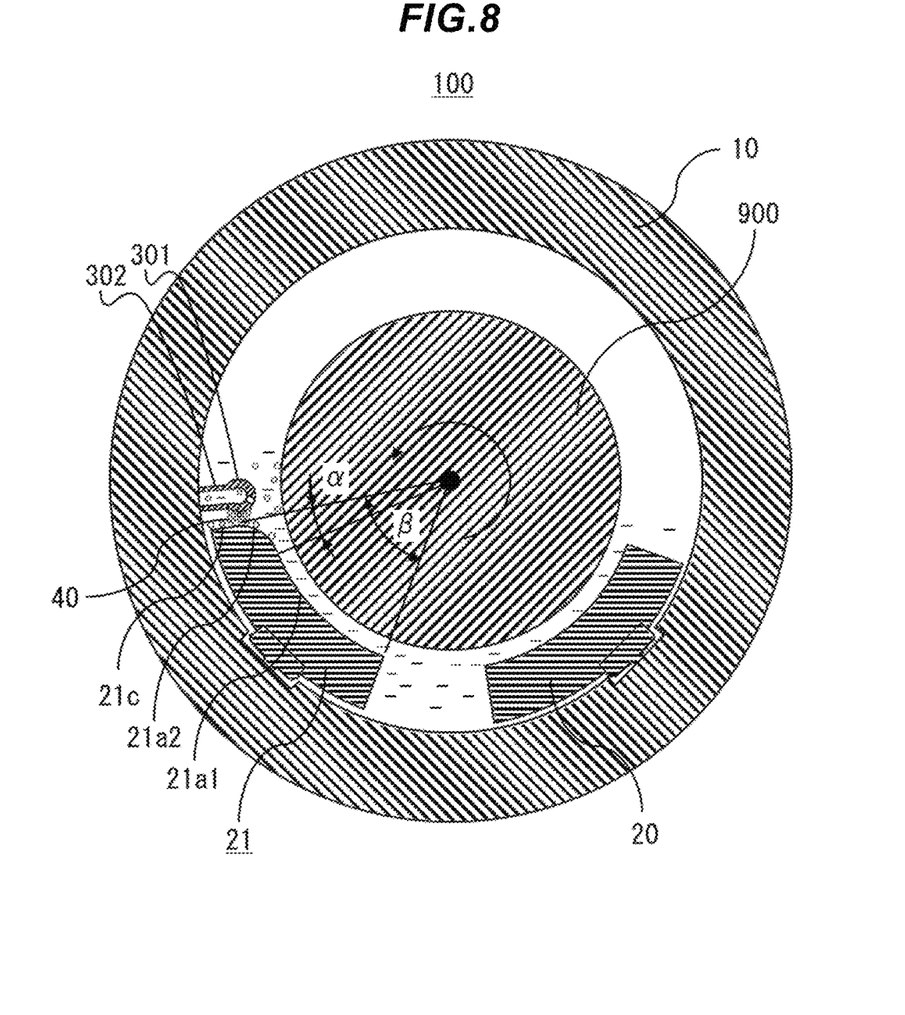
FIG. 8 is a sectional view perpendicular to the axial direction, which shows the constitution of the journal bearing according to the Embodiment 2.

The journal bearing 100 according to the Embodiment 2 will be explained. FIG. 8 is a sectional view perpendicular to the axial direction, which shows the constitution of the journal bearing 100 according to the present Embodiment. It is worth noting that, as for the same constitution as the Embodiment 1, explanation is omitted.

Figure 9:
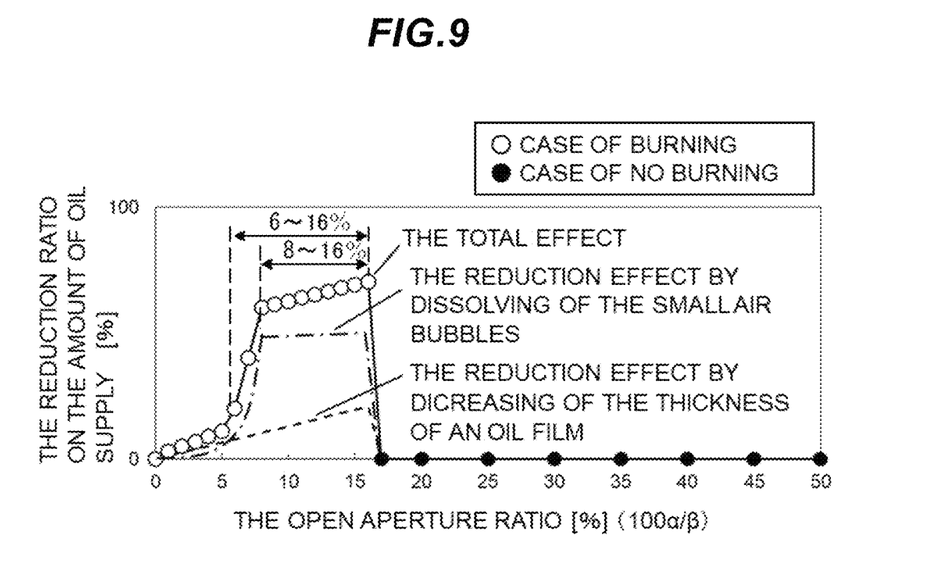
FIG. 9 is a drawing which shows a reduction effect on the amount of oil supply, in the journal bearing according to the Embodiment 2.

As shown in FIG. 8, the maximum value α of the angle of the opening side face 21*a*2, in the circumferential direction of the rotation shaft 900, is in the range of 8 to 16% to the maximum value β of the angle of the inner periphery face 21*a*, in the circumferential direction. FIG. 9 is a drawing which shows the reduction effect on the amount of oil supply in the journal bearing according to the present Embodiment. The open aperture ratio, on the horizontal axis, is defined as the rate of angle α to angle β (100 α/β). The reduction effect on the amount of oil supply, on the vertical axis, is defined as the rate of reduced amount of oil supply, achieved by providing the opening side face 21*a*2 and restraining an unstable oscillation, against the case where the upstream pad 21 is not equipped with the opening side face 21*a*2.

As the open aperture ratio becomes larger, the pressure of the oil increases, like a quadratic function, where the pressure is due to the wedge effect which is generated in the spacing between the opening side face 21*a*2 and the rotation shaft 900. When the open aperture ratio is 6% or more, a portion of the small air bubbles 801 begins to dissolve in the oil by a pressure increase. When the open aperture ratio exceeds 8%, most of the small air bubbles 801 will dissolve in the oil. Moreover, as the open aperture ratio is larger, the area of the partial cylinder face 21*a*1 decreases. Thereby, in order to obtain the pressure of oil film enough to support the rotation shaft 900, the rotation shaft 900 approaches the partial cylinder face 21*a*1. In addition, by the moment balance at the support position of the upstream pad 21, the upstream pad 21 rotates in a direction opposite to the rotational direction of the rotation shaft 900. Then, the thickness of an oil film at the upstream side decreases. As the thickness of an oil film at the upstream side decreases, it becomes easy to fully fill the region of oil film with oil, with a small amount of oil supply. Thereby, aside from the reduction effect on the amount of oil supply by bubble removal, the reduction effect on the amount of oil supply, which is proportional to an open aperture ratio, can be obtained.

However, if the open aperture ratio exceeds 16%, there is a case where the thickness of an oil film decreases extremely, and the rotation shaft 900 and the partial cylinder face 21a1 may happen to contact, or there is a case where the shear of an oil film is increased, and then, the temperature of an oil film may rise extremely. Further, there is a case where those cases may finally lead to the burn-in or unusual wear of the partial cylinder face 21a1. In that case, the operation cannot be conducted under any conditions of the amount of oil supply, and then there is no reduction effect on the amount of oil supply.

Figure 11:
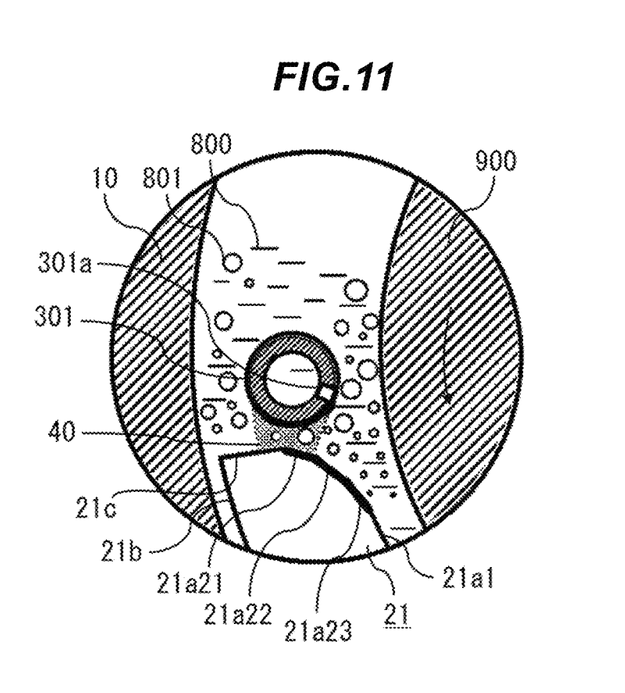
FIG. 11 is a sectional view which shows the surrounding constitution of the oil supply nozzle of the journal bearing, according to the Embodiment 4.

That is, as shown in FIG. 11, if the effect by the dissolution of the small air bubbles 801 and the effect by the reduction in the oil film thickness are added, a prominent reduction effect on the amount of oil supply can be acquired, by arranging the open aperture ratio in the range of 6 to 16%. Moreover, by limiting the open aperture ratio to the range of 8 to 16%, a more prominent reduction effect on the amount of oil supply can be acquired stably.

According to this configuration, regarding the open aperture ratio, that is, the size of the opening side face 21a2, in the circumferential direction over the size of the inner periphery face 21a of the upstream pad 21, in the circumferential direction is set in the range of 6 to 16%, regarding the angle in the circumferential direction of the rotation shaft 900. Thereby, a prominent reduction effect on the amount of oil supply can be acquired. Further, with a small amount of oil supply, the region of oil film can be fully filled with oil, and an unstable oscillation can be restrained more efficiently. Furthermore, by limiting an open aperture ratio in the range of 8 to 16%, a more prominent reduction effect on the amount of oil supply can be acquired stably.

Embodiment 3

Figure 10:
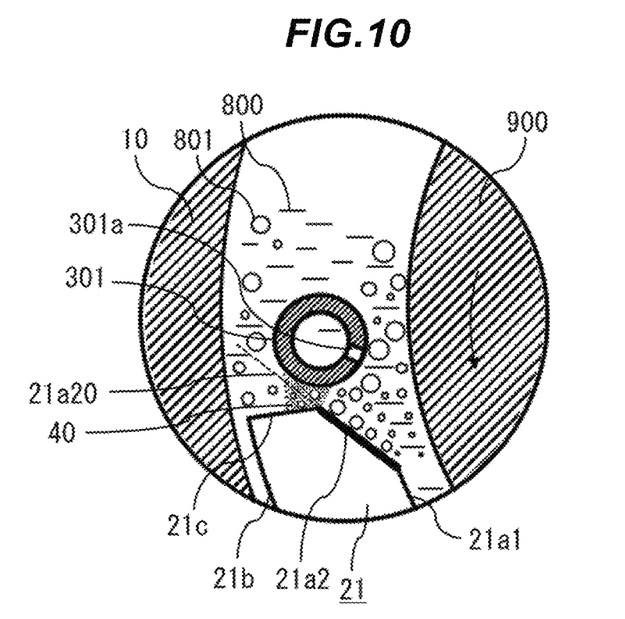
FIG. 10 is a sectional view which shows the surrounding constitution of the oil supply nozzle of the journal bearing, according to the Embodiment 3.

The journal bearing according to the Embodiment 3 will be explained. FIG. 10 is a detailed sectional view of the C portion in FIG. 3, which shows the surrounding constitution of the oil supply nozzle 30 of the journal bearing 100 according to the present Embodiment. In this drawing, the shape of the opening side face 21a2 of the upstream pad 21 is changed from that of the Embodiment 1, and as for the same constitution as the Embodiment 1, explanation is omitted. As shown in FIG. 10, in the position where the front end face 21c and the opening side face 21a2 are connected, a slope face is provided so that the tangent line 21a20 of the opening side face 21a2 may pass through a bubble discharge path 40 (a border plane is also included).

According to this configuration, the bubble discharge path 40 through which the tangent line 21a20 of the opening side face 21a2 passes can be secured. Thereby, without the interruption by the oil distribution part 301, the air bubbles 801, which flow backward to the upstream side along the opening side face 21a2, can be efficiently guided to the bubble discharge path 40.

Embodiment 4

The journal bearing according to the Embodiment 4 will be explained. FIG. 11 is a detailed sectional view of the C portion in FIG. 3, which shows the surrounding constitution of the oil supply nozzle 30 of the journal bearing 100 according to the present Embodiment. It is worth noticing that, in this drawing, the shape of the opening side face 21a2 of the upstream pad 21 is changed from that of the Embodiment 1, and as for the same constitution as the Embodiment 1, explanation is omitted.

As shown in FIG. 11, the opening side face 21a2 consists of a plurality of slope faces or curved surfaces. Among those slope faces or curved surfaces, the opening side face 21a23, in which an angle made with the partial cylinder face 21a1 becomes the smallest, is located in the most downstream side, among the plurality of slope faces or curved surfaces. That is, the angle made between a first tangent line of a slope or curved surface and a second tangent line of the outer periphery face of the rotation shaft 900 becomes minimum in the rear most side of the opening side face 21a2, in the rotational direction of the rotation shaft 900, where the second tangent line is located in the position which opposes in the radial direction with respect to the point of contact of the first tangent line.

According to this configuration, the air bubbles 801 which flow backward to the upstream side along the opening side face 21a23 can be discharged efficiently to the outer diameter side, through the bubble discharge path 40, without the interruption by the opening side face 21a22 and the opening side face 21a21 of the upstream side.

Embodiment 5

Figure 12:
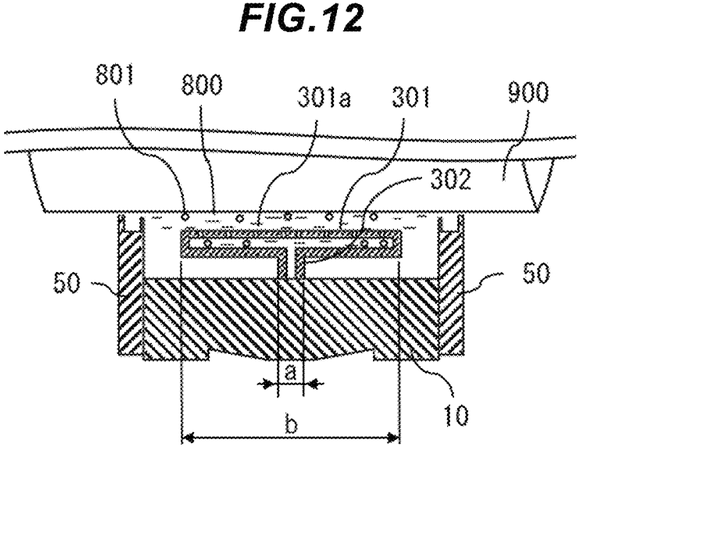
FIG. 12 is a sectional view of the principal part which shows the constitution of the journal bearing according to the Embodiment 5.

The journal bearing according to the Embodiment 5 will be explained. FIG. 12 is a sectional view of the principal part in FIG. 2, which shows the constitution of the journal bearing according to the present Embodiment. It is worth noticing that, as for the same constitution as the Embodiment 1, explanation is omitted.

As shown in FIG. 12, regarding the oil supply nozzle 30, the minimum outside size a of the oil supply inlet 302, in the axial direction, is set to be half or less of the maximum outside size b of the oil distribution part 301, in the axial direction. That is, the relation of $a<b/2$ is satisfied.

According to this configuration, a sufficient flow path is secured between the carrier ring 10 and the oil distribution part 301. Thereby, the air bubbles 801, which have passed through the bubble discharge path 40, can be discharged, through the flow path between the carrier ring 10 and the oil distribution part 301, more efficiently to the atmospheric layer in the vertically above, by buoyant force.

Embodiment 6

Figure 13:
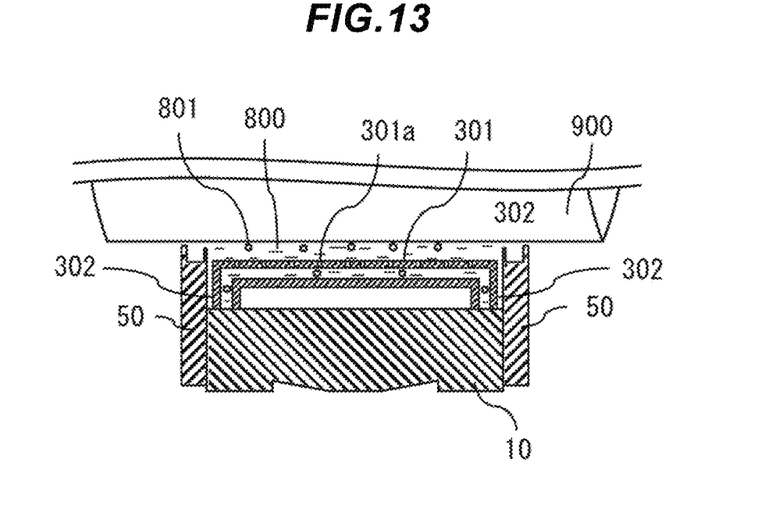
FIG. 13 is a sectional view of the principal part which shows the constitution of the journal bearing according to the Embodiment 6.

The journal bearing according to the Embodiment 6 will be explained. FIG. 13 is a sectional view of the principal part in FIG. 2, which shows the constitution of the journal bearing according to the present Embodiment. In this drawing, the shape of the oil supply nozzle 30 is changed from that of the Embodiment 1, and as for the same constitution as the Embodiment 1, explanation is omitted.

As shown in FIG. 13, regarding the oil supply nozzle 30, the oil supply inlet 302, which is connected with the oil distribution part 301 and the carrier ring 10, is arranged at the outside of the axial directional center of the oil distribution part 301, for example, at the both ends of the axial direction.

According to this configuration, at the position of the axial directional center of the oil distribution part 301, a flow path is secured between the oil distribution part 301 and the carrier ring 10. Thereby, the air bubbles 801, which have passed through the bubble discharge path 40, can be discharged by buoyant force, through the flow path between the carrier ring 10 and the oil distribution part 301, more efficiently to the atmospheric layer in the vertically above. The pressure of oil film which supports the rotation shaft 900 becomes highest at the position of the axial directional center of the partial cylinder face 21*a*1. Thereby, full weight is placed on the restraint of the invasion of the air bubbles 801 at the position of the axial directional center, and then, an unstable oscillation can be restrained more efficiently.

Moreover, according to the present Embodiment, the flow of the oil which is on the inside of the oil distribution part 301 is in the direction which directs towards the axial directional center from the oil supply inlets 302 at the axial directional both ends. Thereby, the flow of the oil which is supplied through the oil supply hole 301*a* also contains a velocity vector of the direction, which directs towards the axial directional center from the axial directional both ends. Therefore, the amount of oil supply at the axial directional center position can be increased relatively. Further, with a small amount of oil supply, the region of oil film at the axial directional center position, where the pressure of oil film is high, can be fully filled with oil, and an unstable oscillation can be restrained more efficiently.

Furthermore, according to the present Embodiment, oil supply inlets 302 are arranged at the axial directional both ends of the oil distribution part 301. However, if an oil supply inlet is arranged only one of the both ends, the flow path between the oil distribution part 301 and the carrier ring 10 will be secured more widely. Thereby, the air bubbles 801 can be discharged more efficiently to the atmospheric layer. That is, the invasion of air bubbles 801 can be restrained more efficiently, and an unstable oscillation can be restrained.

Embodiment 7

Figure 14:
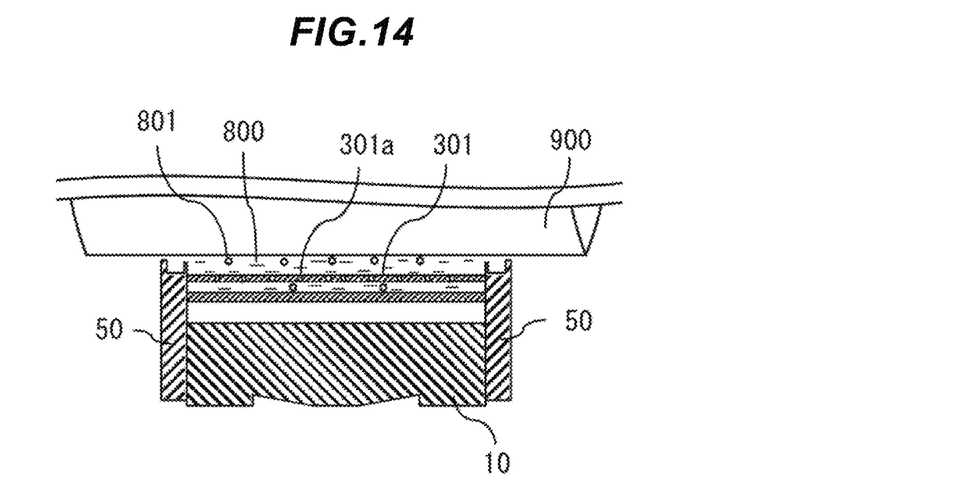
FIG. 14 is a sectional view of the principal part which shows the constitution of the journal bearing according to the Embodiment 7.

The journal bearing according to the Embodiment 7 will be explained. FIG. 14 is a sectional view of the principal part in FIG. 2, which shows the constitution of the journal bearing according to the present Embodiment. In this drawing, the shape of the oil supply nozzle 30 is changed from that of the Embodiment 1, and as for the same constitution as the Embodiment 1, explanation is omitted.

As shown in FIG. 14, without establishing the oil supply inlet 302, the oil distribution part 301 is directly connected with the two side plates 50, which enclose, in the axial direction, the downstream pad 20 and the upstream pad 21.

According to this configuration, at all of the axial directional positions of the oil distribution part 301, a flow path is secured between the oil distribution part 301 and the carrier ring 10. Thereby, the air bubbles 801 can be more efficiently discharged to the atmospheric layer. That is, the invasion of the air bubbles 801 can be restrained more efficiently, and an unstable oscillation can be restrained.

Moreover, according to the present Embodiment, the oil distribution part 301 is connected with two side plates 50. However, even when the oil distribution part 301 is configured to be connected with one side plate 50 only, it is possible to yield the same effect.

Embodiment 8

Figure 15:
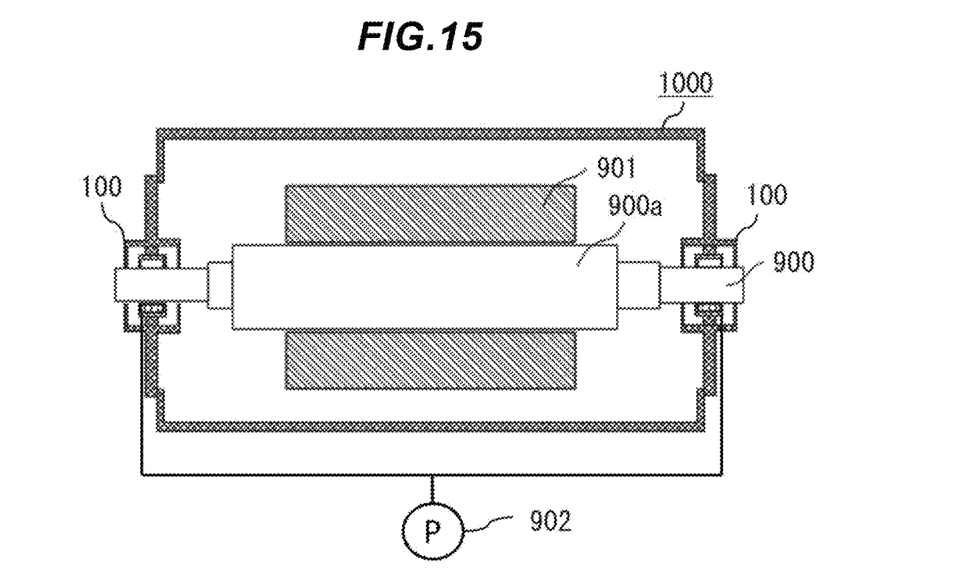
FIG. 15 is a sectional view which shows the constitution of the rotary appliance using the journal bearing according to the Embodiment 8.

The rotary appliance according to the Embodiment 8 will be explained. FIG. 15 is a sectional view which shows the constitution of the rotary appliance 1000 according to the present Embodiment, where the rotary appliance is cut along the axial direction. The up and down direction in FIG. 15 denotes, for example, a vertical up and down direction. As shown in FIG. 15, the rotary appliance 1000 is equipped with a rotation shaft 900 which is installed horizontally, a pair of journal bearings 100 which supports the both ends of the rotation shaft 900 rotatably, and a stator 901 which is installed at the outer periphery side of the rotation shaft 900. At least one of the pair of journal bearings 100 is a journal bearing according to any of the Embodiments 1 to 7.

Each of the journal bearings 100 is installed at the outer periphery side of the end portion of the rotation shaft 900. Each of the journal bearings 100 supports the radial directional load of the rotation shaft 900, including the self weight of the rotation shaft 900. The rotation shaft 900 has a rotor 900*a* in which magnetic poles are formed. In the present Embodiment, as an example of the rotary appliance 1000, illustrated is a rotation electric machine which induces an alternating current voltage in the stator 901 and generates electricity.

According to the present Embodiment, bearing loss which is caused in the journal bearing 100, with respect to the energy of the rotation shaft 900, can be reduced. Thereby, the power generation efficiency of the rotation electric machine can be increased. Moreover, since the amount of oil supply which is supplied to the journal bearing 100 can be reduced, the oil supply equipment, like an oil feed pump 902, can be reduced in size.

In the journal bearing 100 according to any of the Embodiments 1 to 8, the number of oil supply nozzles may be two or more. Moreover, as for the arrangement position concerning each of the pads and oil supply nozzles, it is not limited to the arrangement position shown in FIG. 2.

In the journal bearing 100 according to any of the Embodiments 1 to 8, the shape and arrangement of the flow path for supplying oil to the oil supply inlet 302 is not restricted.

In the journal bearing 100 according to any of the Embodiments 1 to 8, the opening side face 21*a*2 may be provided in the downstream pad 20, and the oil distribution part 301, the oil supply hole 301*a*, and the bubble discharge path 40 may be provided at the upstream side of the downstream pad 20. According to this, the position of the axial center of the rotation shaft 900 is at a bilaterally symmetrical position, and it becomes possible to increase the thickness of an oil film. Moreover, when the oil which is in the spacing between the inner periphery face 21*a* of the upstream pad 21 and the outer periphery face of the rotation shaft 900 slips out from the spacing in the rotational direction, cavitation (gaseous firing) will be caused, due to a rapid decreased pressure. However, it is also possible to restrain the flowing of the gas which is generated by the cavitation, along the rotation of the rotation shaft 900, into the spacing between the inner periphery face of the downstream pad 20 and the outer periphery face of the rotation shaft 900.

In the journal bearing 100 according to any of the Embodiments 1 to 8, it is allowed that the downstream pad 20 and the upstream pad 21 may have a monolayer structure formed of a single material, and may have a multilayer structure formed of two or more materials. As for the formation material of the downstream pad 20 and the upstream pad 21, various materials, such as metal and resin, can be used.

In the journal bearing 100 according to any of the Embodiments 1 to 8, it is allowed that the downstream pad 20 and the upstream pad 21 may have a fixed axial direction width over the whole in the circumferential direction, and may have an axial direction width which is different at each position of the circumferential direction.

As for the journal bearing 100 according to any of the Embodiments 1 to 8, contained is a state where the lubricating oil 800 is not supplied to the inside of the journal bearing 100.

In the journal bearing 100 according to any of the Embodiments 1 to 8, the shape of the oil distribution part 301 of the oil supply nozzle 30 is not limited to the shape of a cylinder. As far as the cross-sectional shape is in a shape, such as an ellipse or a polygon, in which the bubble discharge path 40 can be formed by the flow of the lubricating oil 800, the same effect will be acquired even in other shapes.

In the present application, expressions showing a direction, such as "axial direction", "radial direction", "circumferential direction", "rotational direction" and "perpendicular", not only include a direction used in such a strict way, but also include a direction where the same function is obtained substantially.

In the present application, the expression showing the change in length or number, like "become smaller toward the downstream side", is not limited to the state of decreasing in monotone, but includes a state in which only a portion of the range decreases, a state in which decrease rate is different in every range, and a state in which length or number decreases gradually. As for the expressions like "become larger toward the downstream side", the same is also true.

In the present application, expressions, like "equipped with", "provided with", "containing", and "having" are not exclusive expressions in which the existence of other components is excluded.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

EXPLANATION OF NUMERALS AND SYMBOLS

10 Carrier ring; 20 Downstream pad; 21 Upstream pad; 21a Inner periphery face; 21a1 Partial cylinder face; 21a2 Opening side face; 21a20 Tangent line; 21a21 Opening side face; 21a22 Opening side face; 21a23 Opening side face; 21b Outer periphery face; 21c Front end face; 30 Oil supply nozzle; 301 Oil distribution part; 301a Oil supply hole; 302 Oil supply inlet; 3011 Outer wall face; 40 Bubble discharge path; 50 Side plate; 100 Journal bearing; 800 Lubricating oil; 801 Air bubble; 900 Rotation shaft; 900a Rotor; 901 Stator; 902 Oil feed pump; 1000 Rotary appliance.

What is claimed is:

1. A journal bearing which supports a rotation shaft of a rotary appliance, the journal bearing, comprising;
    an oil supply nozzle which has an oil distribution part, extending in an axial direction of the rotation shaft and supplying lubricating oil, and
    a pad which is provided at a rear side of the oil supply nozzle, in a rotational direction of the rotation shaft, and supports the rotation shaft rotatably,
    wherein an inner periphery face of the pad, which opposes an outer periphery face of the rotation shaft, has an opening side face, in which a radial direction spacing between the inner periphery face and the outer periphery face of the rotation shaft becomes smaller, from a front end face of the pad, located at a front side in the rotational direction of the rotation shaft, toward the rear side in the rotational direction,
    the opening side face of the pad has a plurality of slopes or curved surfaces, and
    between the oil distribution part and the pad, the journal bearing has a bubble discharge path which discharges air bubbles mixed in the lubricating oil.

2. The journal bearing according to claim 1,
    wherein a line extending from a contacting position between the front end face and the opening side face passes through an inside of the bubble discharge path.

3. The journal bearing according to claim 2,
    wherein an angle between the plurality of slopes or curved surfaces and a tangent line of the outer periphery of the rotation shaft decreases in the direction of rotation.

4. The journal bearing according to claim 2,
    wherein a minimum outside size of an oil supply inlet, in the axial direction, which fuels the lubricating oil to the oil distribution part of the oil supply nozzle, is half or less of the maximum outside size of the oil distribution part, in the axial direction.

5. The journal bearing according to claim 2,
    wherein an oil supply inlet, which fuels the lubricating oil to the oil distribution part of the oil supply nozzle, is provided outside of an axial direction center of the oil distribution part.

6. The journal bearing according to claim 1,
    wherein an angle between the plurality of slopes or curved surfaces and a tangent line of the outer periphery of the rotation shaft decreases in the direction of rotation.

7. The journal bearing according to claim 1,
    wherein a minimum outside size of an oil supply inlet, in the axial direction, which fuels the lubricating oil to the oil distribution part of the oil supply nozzle, is half or less of the maximum outside size of the oil distribution part, in the axial direction.

8. The journal bearing according to claim 1,
    wherein an oil supply inlet, which fuels the lubricating oil to the oil distribution part of the oil supply nozzle, is provided outside of an axial direction center of the oil distribution part.

9. A journal bearing which supports a rotation shaft of a rotary appliance, the journal bearing, comprising;
    an oil supply nozzle which has an oil distribution part, extending in an axial direction of the rotation shaft and supplying lubricating oil, and
    a pad which is provided at a rear side of the oil supply nozzle, in a rotational direction of the rotation shaft, and supports the rotation shaft rotatably,
    wherein an inner periphery face of the pad, which opposes an outer periphery face of the rotation shaft, has an opening side face, in which a radial direction spacing between the inner periphery face of the pad and the outer periphery face of the rotation shaft becomes smaller, from a front end face of the pad, located at a front side in the rotational direction of the rotation shaft, toward the rear side in the rotational direction, between the oil distribution part and the pad, the journal bearing has a bubble discharge path which discharges air bubbles mixed in the lubricating oil, wherein a circumferential direction size of the opening side face extends in a range of 6 to 16% of the entire circumferential direction size of the inner periphery face of the pad.

10. The journal bearing according to claim 9, wherein a line extending from a contacting position between the front end face and the opening side face passes through an inside of the bubble discharge path.

11. The journal bearing according to claim 9, wherein the opening side face of the pad has a plurality of slopes or curved surfaces, and an angle between the plurality of slopes or curved surfaces and a tangent line of the outer periphery of the rotation shaft decreases in the direction of rotation.

12. The journal bearing according to claim 9, wherein a minimum outside size of an oil supply inlet, in the axial direction, which fuels the lubricating oil to the oil distribution part of the oil supply nozzle, is half or less of the maximum outside size of the oil distribution part, in the axial direction.

13. The journal bearing according to claim 9, wherein an oil supply inlet, which fuels the lubricating oil to the oil distribution part of the oil supply nozzle, is provided outside of an axial direction center of the oil distribution part.

14. A rotary appliance using a journal bearing, where a rotation shaft of the rotary appliance is supported by the journal bearing, comprising;

an oil supply nozzle which has an oil distribution part, extending in an axial direction of the rotation shaft and supplying lubricating oil, and a pad which is provided at a rear side of the oil supply nozzle, in a rotational direction of the rotation shaft, and supports the rotation shaft rotatably, wherein an inner periphery face of the pad, which opposes an outer periphery face of the rotation shaft, has an opening side face, in which a radial direction spacing between the inner periphery face and the outer periphery face of the rotation shaft becomes smaller, from a front end face of the pad, located at a front side in the rotational direction of the rotation shaft, toward the rear side in the rotational direction, the opening side face of the pad has a plurality of slopes or curved surfaces, and between the oil distribution part and the pad, the journal bearing has a bubble discharge path which discharges air bubbles mixed in the lubricating oil.

15. The rotary appliance of claim 14, wherein a circumferential direction size of the opening side face extends in a range of 6 to 16% of the entire circumferential direction size of the inner periphery face of the pad.

* * * * *